May 12, 1964     E. D. CREESE ETAL     3,133,007
PLATING APPARATUS

Filed June 29, 1961     4 Sheets-Sheet 1

INVENTORS.
Earl D. Creese,
Hugh F. Jones.
BY
                   ATTORNEYS

United States Patent Office 3,133,007
Patented May 12, 1964

3,133,007
PLATING APPARATUS
Earl D. Creese, Clinton County, and Hugh F. Jones, Wayne County, Mich., assignors to Federal-Mogul-Bower Bearings, Inc., Detroit, Mich., a corporation of Michigan
Filed June 29, 1961, Ser. No. 120,625
10 Claims. (Cl. 204—198)

The present invention broadly relates to electroplating apparatus and more particularly to an improved cell-type electroplating apparatus and work rack for electroplating the concave surfaces of workpieces.

The present invention is particularly applicable, but not necessarily limited to, the electro-deposition of a controlled thickness of a soft bearing metal on the inner concave surface of shell or sleeve-type half bearings having a semi-circular cross section and which are used either singly or in pairs for rotatably supporting journals such as crankshafts and connecting rods in internal combustion engines and the like. Bearings of this general type conventionally consist of a composite construction comprising a high strength outer backing member such as steel, for example, having a bearing layer tenaciously bonded to the inner surface thereof such as copper or aluminum or alloys thereof. The bearing layer can be applied by sintering, casting, roll-cladding, electro depositing, and the like. Under certain operating conditions the inclusion of an overplate of a soft bearing metal such as lead, tin, copper, indium, or alloys thereof, for example, provides improved bearing characteristics and increased bearing life.

The overplate of a soft bearing material ranging in thickness from several ten-thousandths of an inch up to several thuosandths of an inch is conventionally applied to the inner surface of the bearing after the bearing has been formed to the appropriate configuration and machined to the desired dimensional tolerances. It is important that the periphery or outer surface of the bearing remains substantially free of any of the overplate material since an appreciable coating of overplate on the outer surface thereof results in a loosening up of the bearing after a period of use due to the increased clearance resulting from a plastic flow of the soft overplate metal.

Conventionally, the overplate on the bearing layer is applied by processing the bearings through a liquid treating sequence comprising a pretreatment phase including cleaning, pickling, and rinsing, for example, followed thereafter by one or more electro deposition operations, after which the overplated bearing is subjected to a final treatment phase such as rinsing, drying, etc. To prevent electro deposition of the overplate material on the outer surface of the bearing, it has heretofore been necessary to mask or otherwise shield the outer surface of the bearing during the treating sequence. This has alternatively been achieved by physically masking the outer surface of the bearing by applying a nonconductive coating or shield thereover or by employing an electroplating rack which restricts deposition of metal on the outer surface of the bearing. Physical masking techniques heretofore employed have been extremely costly and time-consuming and commercially impractical for high production operation. On the other hand, special electroplating racks heretofore employed for selectively depositing the overplate on the inner surface have been cumbersome, fragile, expensive, and furthermore have the tendency of causing excessive drag-out and drag-in of the various treating solutions from one treating receptacle to another treating receptacle due to inadequate drainage. In addition, such work racks frequently prevent adequate cleaning, rinsing, and pretreatment of the surfaces of the bearing in the other treating solutions due to the physical obstructions of the plating rack preventing adequate solution contact and circulation.

In addition to the foregoing disadvantages, a number of specialized work racks employed for electroplating precision bearings incorporate a self-contained anode which is centrally disposed with respect to the arcuate curvature of the concave surface. During the electroplating operations, a slight out-of-roundness of the anode frequently occurs which has a tendency to cause a considerable variation in the thickness and in the composition of the plating. This also occurs when the anode is positioned eccentrically with respect to the concave surface. A further disadvantage of these racks is the necessity of using substantially lower current densities than those which might be otherwise desired to avoid the electro deposition of non-uniform layers and to prevent short circuiting of the work rack. An additional disadvantage comprises the difficulty and time-consuming practice of periodically replacing the anodes as they are consumed after a period of electroplating use.

Accordingly, it is a primary object of the present invention to provide an electroplating apparatus which provides for improved plating of the concave surfaces of workpieces such as shell-type half bearings and the like and which apparatus overcomes the difficulties and disadvantages of the masking techniques and specialized plating racks heretofore employed.

Another object of the present invention is to provide an improved cell-type electroplating apparatus employing an open-type work rack which enables quick and simple loading and unloading of the workpieces and provides for increased circulation and contact of the treating solution with the surfaces to be treated providing for improved pretreatment and rinsing of the workpieces resulting in superior surface finishes.

Still another object of the present invention is to provide an improved cell-type plating apparatus employing an open-type work rack which substantially eliminates treating solution drag-out and drag-in thereby substantially decreasing solution waste and contamination and concurrently minimizing or reducing treating solution control check analyses and resulting in improved surface finishes.

A further object of the present invention is to provide an improved cell-type electroplating apparatus employing a magnetic type work rack which is of light weight, open construction, simple design, and of low cost of manufacture and which work rack facilitates handling and loading and unloading of a plurality of workpieces in rows.

A still further object of the present invention is to provide an electrtoplating apparatus employing a cell-type treating receptacle at only those treating stations wherein selective shielding of the surfaces of the workpieces is required thereby providing for increased processing efficiency and simplicity of the electroplating operation.

Yet still another object of the present invention is to provide a cell-type electroplating apparatus wherein the treating cell is stationarily immersed in a treating receptacle in which a work rack having a plurality of workpieces thereon can be simply inserted and withdrawn to achieve selective electroplating of the concave surfaces thereof.

Yet a still further object of the present invention is to provide a cell-type electroplating apparatus comprising a stationary treating cell and a portable work rack enabling wide variations in electroplating current densities and flexibility in anode composition and location providing improved processing versatility and flexibility.

Still another object of the present invention is to provide a cell-type plating apparatus and work rack which are of simple design, of simple and economical manufacture, of durable operation, and which can be readily incorporated at selected stations of an electroplating machine.

Other objects and advantages of the present invention will become apparent from the following detailed description taken in conjunction with the accompanying drawings, wherein:

FIG. 9 is a schematic plan view illustrating an alternate embodiment of the present invention wherein a rotary treating receptacle is employed in which a plurality of treating cells are positioned in substantially equal arcuate spaced increments along the outer edge portion thereof.

Figure 1:
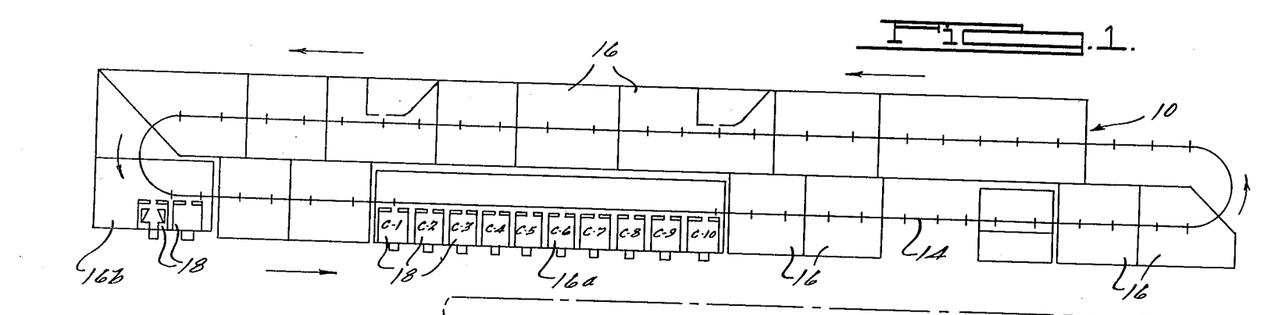
FIGURE 1 is a schematic plan view of a typical electroplating machine incorporating a series of treating cells of the type comprising the present invention.
Figure 2:
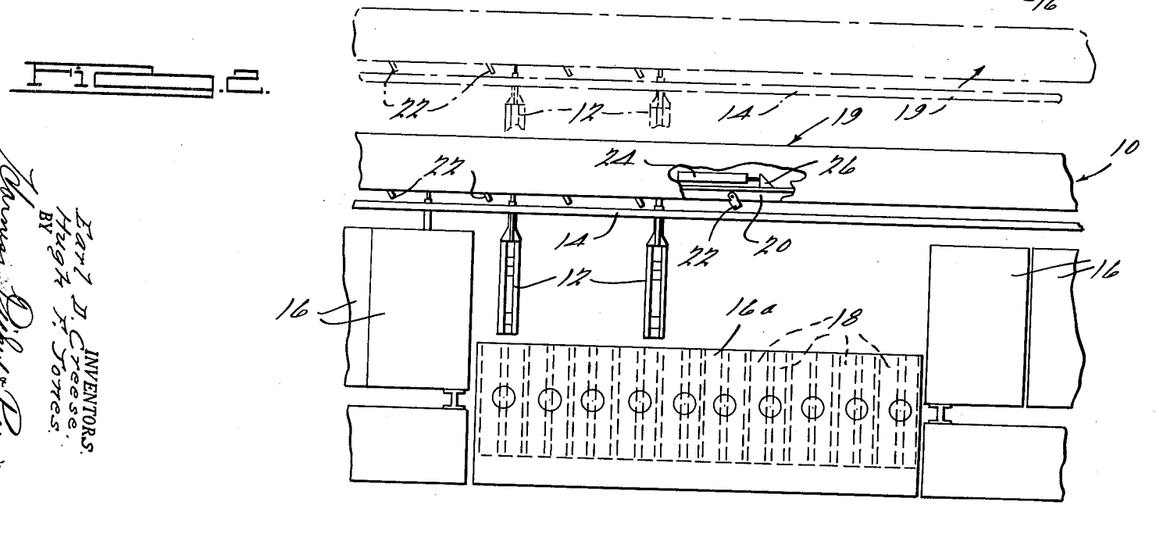
FIG. 2 is a fragmentary side elevation view of the electroplating machine shown in FIGURE 1 and showing in particular the relationship between the supporting rail on which the work racks are movably mounted and a treating receptacle incorporating therein a plurality of the treating cells.

Referring now to the drawings and as may be best seen in FIGURES 1 and 2, a typical processing machine generally indicated at 10 is illustrated providing for automatic sequential movement of a plurality of work racks 12 through a predetermined treating sequence. The processing machine 10 includes an overhead supporting rail 14 which in the exemplary machine shown comprises a pair of straight side sections connected at their ends by arcuate turn-around sections forming a continuous loop along which the work racks 12 are intermittently advanced. The supporting rail 14 extends above an aligned series of treating receptacles 16 including a multiple station cell-type treating receptacle 16a extending along one of the side portions of the processing machine and a two-station cell-type treating receptacle 16b disposed at one end of the machine. The cell-type treating receptacles 16a, 16b are provided with a series of aligned treating cells 18 which are at least partially immersed in the treating solution and which are adapted to receive and removably support a work rack 12 and the workpieces thereon during an electroplating operation.

Sections of the supporting rail 14 are fixedly disposed over the treating receptacles while other sections thereof are connected to an elevator chassis 19 which is movable to and from a lowered position as shown in solid lines in FIG. 2 to a raised position shown in phantom. Movement of the elevator chassis to and from the raised position and the lowered position such as by a hydraulic cylinder, for example, provides for a lifting of the work racks 12 supported on the movable supporting rail sections 14 whereby the work racks can be advanced above the partitions separating adjoining treating receptacles.

In the exemplary processing machine 10 illustrated in the drawings, intermittent advancement of the work racks 12 along the supporting rail 14 is achieved by a reciprocable pusher mechanism as may be best seen in FIG. 2, comprising a pusher bar 20 slidably mounted on the elevator chassis 19 longitudinally of the supporting rail 14 and incorporating a plurality of pivotally mounted pushers 22 thereon which are adapted to engage and advance the work carriers in the direction of the arrows during the advancing stroke of the pusher bar. The pushers 22 are pivotally mounted on the pusher bar 20 so that the pusher can pivot upwardly to an inoperative position and over a work carrier during the retracting movement of the pusher bar and then drop down to an operative position behind the work carrier preparatory to the next advancing movement. The pushers 22 incorporate suitable stop means therein adapted to coact with the pusher bar 20 to prevent their pivoting movement during the advancing stroke of the pusher bar. Movement of the pusher bar 20 and pushers 22 thereon to and from an advanced position and a retracted position is achieved by a double acting fluid actuated transfer cylinder 24 mounted on the elevator chassis 19 and having the rod end thereof connected to a depending ear 26 connected to one of the pusher bars 20. It will be understood that alternate satisfactory advancing means such as, for example, an intermittently driven continuous chain can be employed for intermittently advancing the work carriers 12 along the supporting rail 14.

Figures 3, 4, 5:
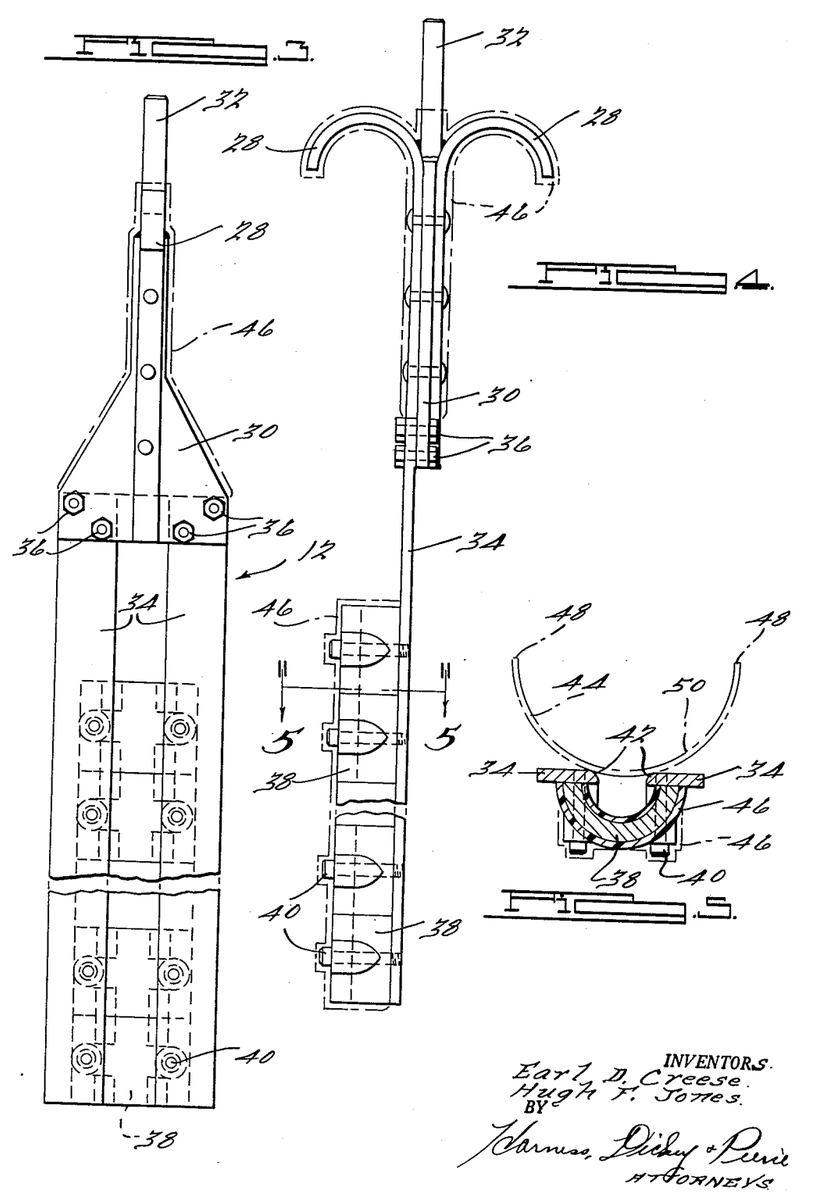
FIG. 3 is a front elevational view of a magnetic work rack employed for supporting the workpieces with their concave surfaces facing outwardly of the work rack and disposed in end to end substantially longitudinal alignment.
FIG. 4 is a side elevation view of the work rack shown in FIG. 3.
FIG. 5 is a transverse sectional view of the work rack shown in FIG. 4 and taken along the line 5—5 thereof and illustrating in phantom a shell-type half bearing supported thereon.
Figure 5:
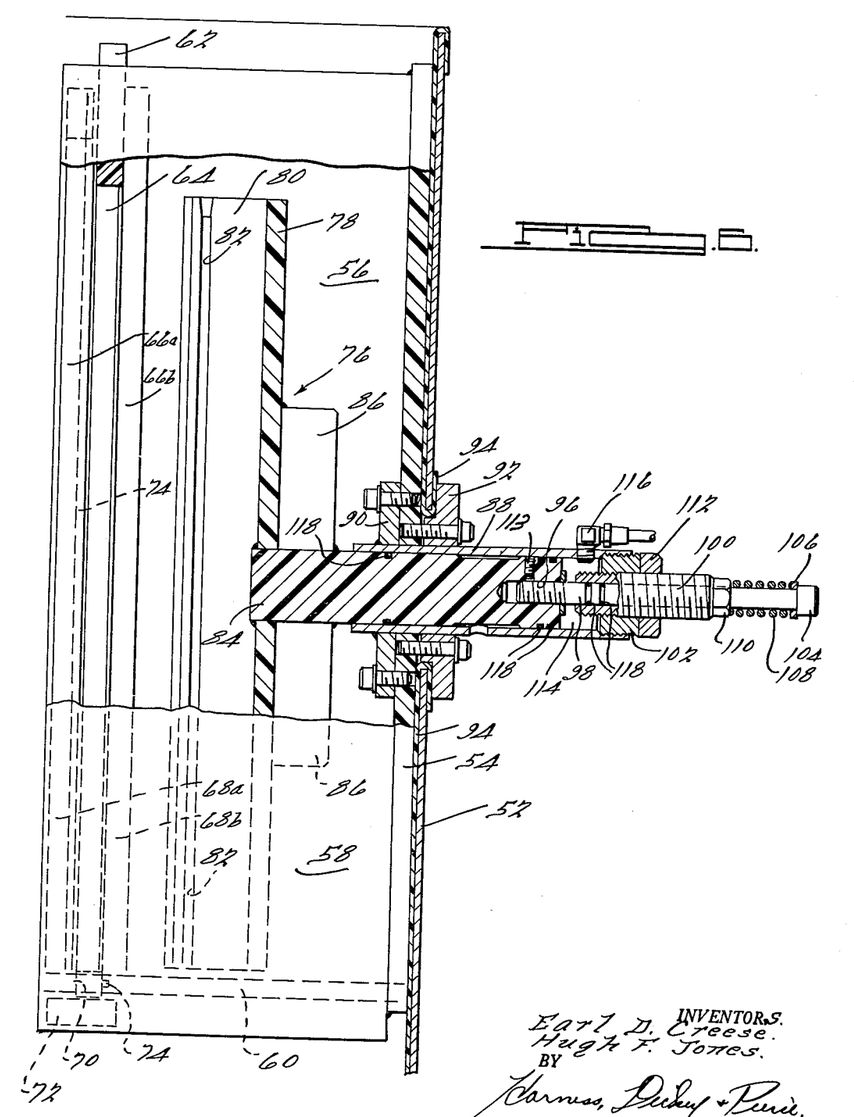

The work rack 12 as may be best seen in FIGS. 3 to 5 comprises an elongated frame including a pair of hangers or hooks 28 which are fixedly secured such as by rivets, to the opposite faces of an intervening copper cathode web 30 which is provided at the upper end thereof with a terminal 32, which can be conveniently connected to a current source at those stations wherein an electroplating operation is to be performed. The particular configuration of the hooks 28 and the relative disposition and number thereof on the upper portion of the work rack 12 can be varied in accordance with the specific configuration of the supporting rail 14 on which the work racks are suspended and whether manual, semi-automatic, or automatic means are employed for inserting and withdrawing the work racks from the treating cells 18. To the lower portion of the web 30, a pair of rail members 34, which are of a highly conductive metal such as copper or brass, for example, are affixed such as by means of bolts 36 providing a good electrical connection to the web 30. The rail members 34 extend in the spaced substantially parallel relationship and are provided with a series of permanent magnets 38 extending transversely thereof and securely fastened thereto by means of a series of socket screws 40. The adjacent edges of the rail members 34, as may be best seen in FIG. 5, are provided with a curvature 42 to facilitate the seating and appropriate positioning of a workpiece 44 such as a shell-type half bearing as shown in phantom in FIG. 5. The workpieces 44 are maintained and held in appropriate position by the magnetic attraction of the permanent magnets 38.

In addition to supporting the workpieces 44, the rail members 34 also serve as conductors for supplying electric current from the terminal 32, through the web 30 and thence through the rail members 34 which are disposed in contact with the rear surface of the workpieces 44.

In order to minimize corrosive attack of portions of the work rack by the acidic and alkaline treating solutions in which they are immersed, it is preferred that the hooks 28 and the permanent magnets 38 are provided with a protective coating 46 over the surfaces thereof such as a coating of polyethylene or polyvinyl chloride plastic, for example.

By virtue of the construction of the work rack 12 shown in FIGS. 3 to 5, the workpieces 44 can be quickly and simply loaded thereon and unloaded therefrom. In addition, the specific construction of the work rack enables the handling of the workpieces such as shell-type half bearings in rows wherein their end edges are disposed in abutting relationship and their parting edges 48 are disposed in substantially longitudinal alignment. With the workpieces 44 positioned in accordance with the arrangement shown in FIG. 5, the inner or concave surfaces 50 thereof face outwardly of the work rack and are readily accessible to contact with the treating solutions in which they are immersed. It will be apparent that the open construction of the loaded work rack facilitates solution run-off when the work rack is withdrawn from a treating solution thereby minimizing solution drag-out and substantially eliminating solution drag-in to the next adjoining treating receptacle, thereby reducing treating solution waste and contamination. In addition, the open rack construction also enables more thorough and complete contact of the treating solution and rinse solutions with the concave surfaces 50 of the workpieces whereby superior surface treatments are achieved.

The work racks 12 and the workpieces thereon are conveyed through the treating receptacles 16 in the direction of the arrows as shown in FIGURE 1 while suspended from the supporting rail 14. When the work racks arrive at the treating receptacles 16a and 16b which are provided with the treating cells 18 therein, the work racks are lowered into the treating cells so as to receive an electroplate on the concave surfaces thereof. The lowering of the work racks into the treating cells can be achieved by manually removing the work racks from the supporting rail or alternatively by providing suitable automatic transfer apparatus wherein the work racks are selectively placed in the treating cells and withdrawn therefrom after a predetermined treating period has expired.

Figures 6, 7, 8:
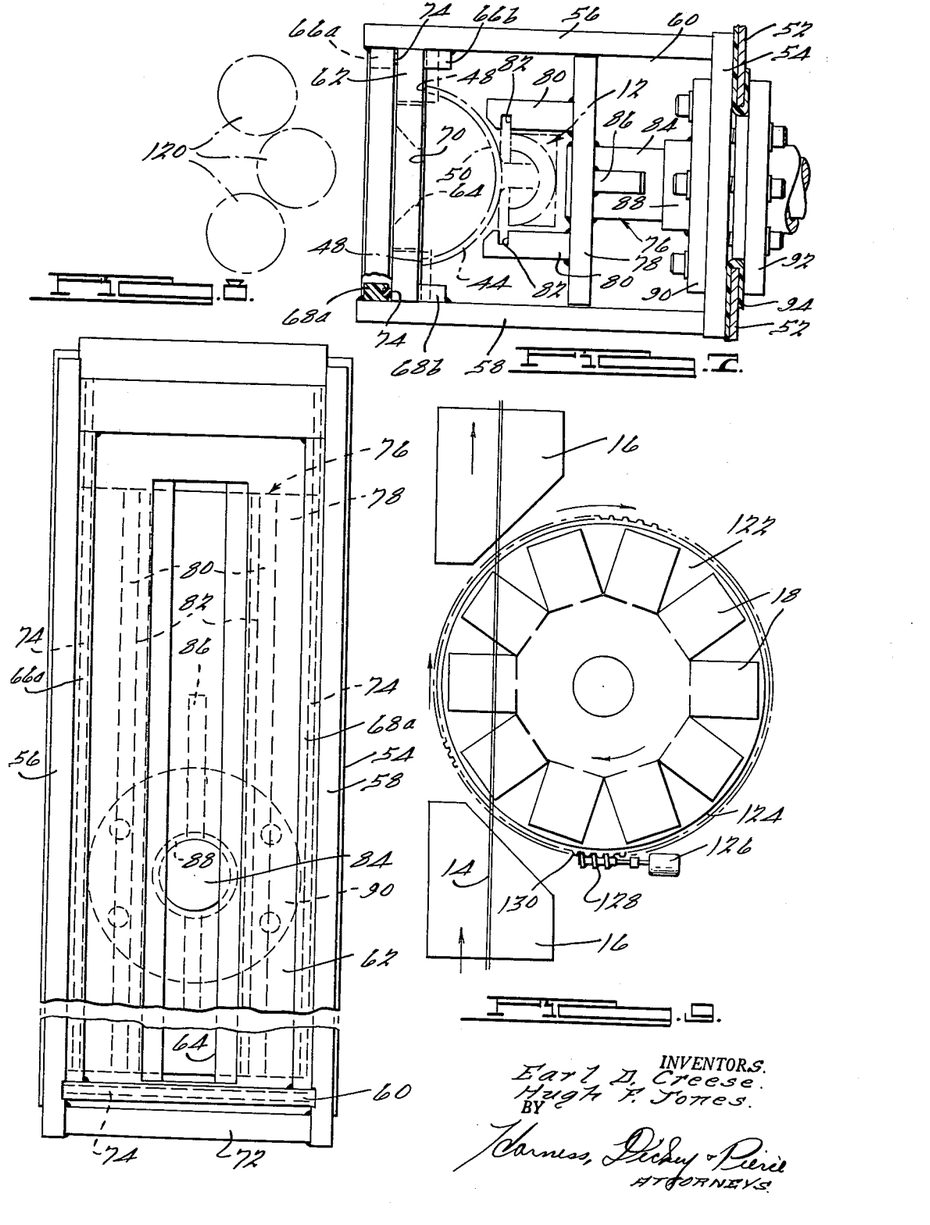
FIG. 6 is a side elevation view partly in section of a treating cell disposed in a liquid treating receptacle.
FIG. 7 is a plan view of the treating cell shown in FIG. 6 and illustrating in addition a work rack positioned in the treating cell and the workpieces thereon disposed in a treating position.
FIG. 8 is a fragmentary front elevation view of the treating cell shown in FIG. 7 and illustrating in particular the front wall having an elongated slot therethrough.

A treating cell incorporating therein the preferred embodiments of the present invention is illustrated in FIGS. 6 to 8 which is adapted to be removably secured to a partition 52 of the treating receptacles and preferably is disposed so that the lower end thereof is slightly above the bottom of the receptacle, to avoid contamination with any sludge or sediment formed therein. The treating cells 18 are all of the same construction and accordingly only one need be shown and described in detail.

The treating cell 18 as shown in FIGS. 6 to 8 is comprised of a generally rectangular three-dimensional enclosure having an open top which projects slightly above the level of the solution in the treating receptacle. The three-dimensional enclosure is formed by a rear or back wall 54 disposed adjacent to the tank partition 52, a pair of side walls 56, 58 affixed to the back wall 54 and disposed in spaced substantially parallel relationship, a bottom wall 60, and a front wall 62 having an elongated aperture or slot 64 therethrough. The back wall 54, side walls 56, 58, and bottom wall 60 are securely fastened together forming a substantially liquid-tight joint therebetween. The front wall 62 is slidably and removably disposed between a pair of guide rails 66a, 66b and 68a, 68b affixed to the inner surface of the side walls 56 and 58 respectively. The lower end of the front wall 62 projects through a slot 70 in the bottom wall 60 and is disposed in abutting relationship against a transverse stop member 72 extending between the the side walls 56, 58. The rearward edge of the slot 70 and the rearward edges of the guide rails 66a, 68a are provided with a suitable resilient gasket or seal 74 such as a rubber seal, for example, which coacts with the engaging surfaces of the front wall 62 forming a sealed joint which restricts seepage of the treating solution therethrough. The interchangeable feature of the front wall 62 enables substitution of front walls having a different size elongated apertures 64 therein in order to achieve optimum electroplating of the concave surfaces 50 of the workpieces depending upon the specific configuration and size of the workpieces to be plated.

Disposed within the plating cell 18 is a rack supporting member 76 which is positioned in a substantially upright position and comprises a transverse member 78 having a pair of forwardly extending flanges 80 affixed thereto and disposed in spaced substantially parallel relationship. Each of the forward inner surfaces of the flanges 80 are provided with a longitudinally extending groove 82 in which the projecting edges of the rail members 34 of the work racks are adapted to be slidably disposed and engaged for removably mounting the work rack 12 in the treating cell 18 during an electroplating operation. A piston rod 84 is affixed to the rear side of the transverse member 78 and is rigidified by means of a pair of webs 86 secured thereto. The piston rod 84 is slidably disposed in a sleeve or cylinder 88 affixed to and extending through the back wall 54 and tank partition 52 as may be best seen in FIG. 6. The cylinder 88 is secured to a circular flange 90 which is bolted to the back wall 54 on the inside of the treating cell 18. A second circular flange 92 is slidably disposed around the cylinder 88 on the outside of the treating receptacle and is bolted to the back wall 54 whereby the edges of the tank partition 52 having a protective coating 94 thereover are clamped between the flange 92 and the back wall 54 forming therewith a liquid tight seal.

The right end of the piston rod 84 as viewed in FIG. 6 is provided with a threaded bore 96 in which a rod 98 is threadably engaged and extends axially and rearwardly therefrom. The rod 98 is slidably disposed in a threaded collar 100 which is disposed in threaded adjustable engagement with a cylinder head 102 threadably affixed to the end of the cylinder 88. The projecting shank end of the rod 98 is provided with a head portion 104 against which a washer 106 and compression spring 108 are firmly seated. The other end of the compression spring 108 is seated against a shoulder of a packing gland nut 110 on the threaded collar 100. By virtue of this arrangement, the compression spring 108 biases the rod 98 and the rack supporting member 76 connected thereto to the right as viewed in FIG. 6 whereby the rack supporting member is moved to a retracted position away from the front wall 62. The biasing force of the coil spring 108 is adjusted by appropriately axially positioning the threaded collar 100 relative to the cylinder head 102 which is then clamped in appropriate position by means of a lock nut 112. In addition, the relative lateral disposition of the rack supporting member 76 with respect to the rear surface of the front wall 62 can be adjusted by turning the rod 98 inwardly or outwardly of the axial bore 96 in the piston rod 84 so as to accommodate workpieces of varying depth. The rod 98 can be locked in the bore 96 by means of a suitable set screw 113.

The cavity between the inner end face of the piston rod 84 and the inner face of the cylinder head 102, forms a compression chamber 114 which is disposed in communication with a conduit 116 which is connected to a suitable source of a pressurized fluid such as air, for example. By injecting a pressurized fluid into the pressure chamber 14, the piston rod 84 is driven outwardly whereby the rack supporting member 76 moves to a projected position or to the left as viewed in FIG. 6 whereby the parting edges 48 of the workpieces 44 on a work rack supported thereby are moved into firm abutting relationship against the rear surface of the front wall 62. In order to minimize leakage of the pressurized fluid from the pressure chamber 114, the piston rod 84 and the rod 98 are provided with a series of O rings 118, around the periphery thereof forming a high pressure seal. Upon release of the pressure in the pressure chamber 114, the rack supporting member 76 and the work rack thereon, are moved from the projected position to the retracted or load-unload position by the resilient biasing force of the compression spring 108. The rack supporting member 76 while in the retracted and projected positions and during the reciprocating travel therebetween is maintained in appropriate upright and transverse alignment by the guiding coaction between the side edges of the transverse member 78 disposed in sliding engagement with the inner surfaces of the side walls 56 and 58.

In accordance with this arrangement, when the rack supporting member 76 is disposed in the retracted position, sufficient clearance is provided between the grooves 82 thereon and the rear surface of the front wall 62 to enable simple loading and unloading of the work rack therefrom. When a work rack is appropriately positioned on the rack supporting member 76, movement thereof to the projected position advances the workpieces forward so that their parting edges 48 are in firm abutting relationship against the rear surface of a front wall 62 preventing migration of treating solution therebetween to the convex surface of the workpieces. When in the projected or treating position, the workpieces are disposed so that their concave surfaces 50 are positioned substantially centrally of the elongated aperture 64 extending longitudinally the wall of the front wall 62.

As can be best seen in FIG. 8, the edges of the elongated aperture 64 are beveled and flare outwardly toward the front surface of the front wall 62 forming therewith a throat through which the cations migrate and deposit in the form of a substantially uniform layer of metal on the concave surfaces of the workpieces. The specific configuration and width of the elongated aperture 64 varies for optimum plating results depending on the specific size and configuration of the workpieces to be plated. Accordingly, a variety of different front walls 62 each having different sized and shaped apertures therethrough are provided and are interchangeable in accordance with the specific type of workpiece being treated. This feature increases the versatility and flexibility of the plating cells providing for optimum electroplating of the concave surfaces of a wide variety of different workpieces. As shown in FIG. 7, one or more anodes 120 are disposed in the treating receptacle forwardly of the front wall 62 and adjacent to the elongated aperture therethrough. The anodes 120 are preferably of a length corresponding to the length of the longitudinal aperture or slot 64, although in certain electroplating operations this may not be desired. The anodes may also be of different materials whereby a deposition of an alloy on the concave surfaces of the workpieces can be achieved.

During the electroplating operation wherein the workpieces are in the treating position and against the rear surface of the front wall 62 and the lower edge of the lowermost workpiece on the work rack is in tight abutting relationship against the bottom wall 60 thereby substantially sealing the rearward convex surfaces of the workpieces from the treating solution and cation current flow. On the supply of electrical current to the terminal 32 the workpieces on the work rack are electrically charged and current flows from the anode or anodes 120 through the elongated aperture 64 toward the concave surfaces of the workpieces. Since the narrow portion of elongated aperture 64 is disposed substantially centrally of the concave surfaces 50 of the workpieces, the distance of travel of the cations from the throat to any point on the concave surface of the workpieces is substantially the same whereby an equal plating tendency is achieved resulting in a substantially uniform thickness of plating on the surfaces of the workpieces. At the same time the rear convex surfaces of the workpieces are substantially free from electro deposition.

In a typical plating operation the work racks 12 having an aligned series of the workpieces 44 thereon are conveyed along the supporting rail 14 through the prescribed treating sequence. When the work rack is advanced to a station where an electroplating operation is to be perfomred, such as in treating receptacles 16a, 16b, the work rack is lowered and removably positioned in the rack supporting member 76 which is disposed in the retracted or load-unload position. Thereafter, pressurized fluid is directed into the cylinder causing the rack supporting member and rack thereon to be moved to the projected or treating position and the plating of the workpieces of the concave surfaces of the workpieces commences. At the expiration of a predetermined plating period as established by the type and thickness of the plating desired, the pressure is released from the pressure chamber 114 whereby the compression spring 108 returns the rack supporting member and work rack thereon to the retracted position whereby the work rack and workpieces thereon can be simply and quickly withdrawn and placed on the supporting rail to continue the sequential treating operations.

In a multiple station, receptacle such as treating receptacle 16a employing, for example, 10 treating cells 18 therein, the work racks are loaded and unloaded in sequence from the treating cells in a leap-frog type manner. For example, in the exemplary plating machine shown in FIGURE 1 employing treating cells C1 through C10, in treating receptacle 16a, the work racks 12 having workpieces thereon would be successively placed in treating cells C1, C2, C3, etc. to C10. Thereafter, the work rack in treating cell C1 would be removed and replaced with the next successive work rack followed by the removal of a work rack in treating cell C2 which would be replaced with the next successive work rack and etc. Those racks which have completed their electroplating treatment in the treating cells are transferred above the treating receptacle 16a until they attain a position above the next adjoining treating receptacle 16 wherein normal automatic sequential operation is again resumed.

An alternate embodiment of the present invention employs a rotatable circular treating receptacle 122 as shown in FIG. 9 in which a plurality of treating cells 18 are disposed in arcuate spaced increments in lieu of the longitudinal arrangement hereinbefore described in connection with the treating receptacle 16a. The treating receptacle 122 is supported on a platform 124 which is rotatable about an axis corresponding substantially to the center of the circular tank 122. Suitable power means such as an electric motor 126 having a worm gear 128 on the output shaft thereof disposed in meshing relationship with gear teeth 130 along the periphery of the platform 124 is employed for continuously or intermittently rotating the circular tank 122 through arcuate increments corresponding to the arcuate spacing between the treating cells 18 therein. In accordance with this arrangement, as the work racks are advanced along the supporting rail 14 in the direction of the arrows as indicated in FIG. 9, successive ones of the treating cells are indexed below the supporting rail 14 whereby the work rack contained in that treating cell is withdrawn and replaced with a new work rack suspended from the supporting rail thereabove. By this arrangement full automatic operation can be achieved in lieu of the leap-frog transfer sequence employed in the treating receptacle 16a as shown in FIGURES 1 and 2.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. In an apparatus for electroplating the concave surfaces of workpieces, the combination comprising a treating cell adapted to be at least partially immersed in a treating solution and a work rack removably positioned in said cell, said work rack including means thereon for removably supporting a plurality of workpieces with the concave surfaces thereof facing outwardly of said work rack and disposed in substantially longitudinal end-to-end alignment, said treating cell comprising a substantially upright three-dimensional enclosure stationarily disposed in a liquid treating receptacle, said enclosure having an open top and including a rear wall, a pair of spaced side walls, and a front wall having an elongated aperture therethrough; a rack supporting member mounted in said cell including means thereon for receiving and removably mounting said work rack, power means connected to said rack supporting member for moving said member and said rack thereon to and from a treating position wherein the workpieces thereon abut the rear surface of said front wall and the concave surfaces thereof are disposed in communicating relationship with said elongated aperture and a load-unload position wherein the workpieces are spaced from said rear surface of said front wall, and means for lowering and raising said work rack into and out of mounted relationship with said rack supporting member when in said load-unload position.

2. In an apparatus for electroplating the concave surfaces of workpieces, the combination comprising a treating cell adapted to be at least partially immersed in a treating solution and a work rack removably positioned in said treating cell, said work rack including means thereon for removably supporting a plurality of workpieces disposed in end-to-end substantially longitudinal alignment with the concave surfaces thereof facing outwardly of said rack, said cell comprising a substantially upright three-dimensional enclosure mounted on a wall of a liquid treating receptacle, said enclosure having an open top and including a rear wall disposed adjacent to a treating receptacle, a pair of spaced side walls, and a front wall having an elongated aperture therethrough; a rack supporting member in said enclosure including means thereon for receiving and removably mounting said work rack and workpieces thereon in a position substantially parallel to said front wall, guide means extending through said rear wall of said enclosure, rod means slidably disposed in said guide means and connected to said rack supporting member, power means for reciprocating said rod means and said rack supporting member in said guide means to and from a treating position wherein the workpieces on said work rack abut the rear surface of said front wall and the concave surfaces thereof are disposed in communicating relationship with said elongated aperture and load-unload position wherein the workpieces are spaced from said rear surface of said front wall.

3. In an apparatus for electroplating the concave surfaces of workpieces, the combination comprising a treating cell adapted to be at least partially immersed in a treating solution and a work rack removably positioned in said cell, said work rack including means thereon for removably supporting a plurality of workpieces disposed in substantially longitudinal end-to-end alignment and with the concave surfaces thereof facing outwardly of said rack, said treating cell comprising a substantially upright three-dimensional enclosure mounted on a wall of a liquid treating receptacle, said enclosure having an open top and including a rear wall disposed adjacent to a treating receptacle, a pair of spaced side walls, and a front wall having an elongated aperture therethrough; a rack supporting member in said enclosure extending transversely of and slidably engaging the side walls thereof; said rack supporting member having a pair of engaging slots for receiving and removably mounting said work rack, a tubular cylinder extending through said rear wall of said enclosure, a piston slidably disposed in said cylinder having one end thereof connected to said rack supporting member, means for reciprocating said piston and said rack supporting member to and from a treating position wherein the workpieces on said rack are disposed in abutting relationship against the rear surface of said front wall and the concave surfaces thereof are disposed in communicating relationship with said elongated aperture and a load-unload position wherein the workpieces are spaced from said rear surface of said front wall.

4. In an apparatus for electroplating the concave surfaces of workpieces, the combination comprising a treating cell adapted to be at least partially immersed in a treating solution and a work rack removably positioned in said cell, said work rack including means for removably supporting a plurality of workpieces disposed in substantially longitudinal end-to-end alignment with the concave surfaces thereof facing outwardly of said rack, said treating cell comprising a substantially upright three-dimensional enclosure mounted on a wall of a liquid treating receptacle, said enclosure having an open top and including a rear wall disposed adjacent to the treating receptacle, a pair of spaced side walls, and a front wall having an elongated aperture therethrough, a rack supporting member disposed in said enclosure including means thereon for receiving and removably mounting said work rack in a position substantially parallel to said front wall, a fluid actuated piston and cylinder assembly comprising a cylinder extending through said rear wall of said enclosure and the wall of said receptacle, a piston slidably disposed in said cylinder having the inwardly projecting end thereof connected to said rack supporting member, conduit means disposed in communication with said cylinder for supplying a pressurized fluid thereto for causing said piston and said rack supporting member to move toward said front wall to a treating position wherein the workpieces thereon are disposed in abutting relationship against the rear surface of said front wall and the concave surfaces thereof are disposed in communicating relationship with said elongated aperture, and resilient means for retracting said piston and said rack supporting member wherein said workpieces are retracted to a load-unload position spaced from said rear surface of said wall.

5. In an apparatus for electroplating the concave surfaces of workpieces, the combination comprising a treating cell adapted to be at least partially immersed in a treating solution and a work rack removably positioned in said cell, said work rack including means thereon for removably supporting a plurality of workpieces disposed in substantially longitudinal end-to-end alignment with the concave surfaces thereof facing outwardly of said rack, said treating cell comprising a substantially upright three-dimensional enclosure mounted on a wall of a liquid treating receptacle, said enclosure having an open top and including a rear wall disposed adjacent to the treating receptacle, a pair of spaced side walls, and a front wall having an elongated aperture extending therethrough, a rack supporting member disposed in said enclosure including a transverse member extending between said side walls and disposed in sliding contact therewith, a single acting fluid actuated piston and cylinder assembly including a cylinder closed at one end thereof and projecting inwardly through the wall of the receptacle and said rear wall of said enclosure and a piston slidably disposed in said cylinder having the inwardly projecting end thereof connected to said rack supporting member, resilient means associated with said piston urging said piston and said rack supporting member to a retracted position wherein the workpieces on a work rack mounted in said rack supporting member are spaced from the rear surface of said front wall of said enclosure, means for adjusting the resilient biasing force of said resilient means, and conduit means for supplying a pressurized fluid to said cylinder for urging said piston and said rack supporting member to a treating position wherein the workpieces are disposed in abutting relationship against the rear surface of said front wall and the concave surfaces thereof are disposed in communicating relationship with said elongated aperture therethrough.

6. In an apparatus for electroplating the concave surfaces of workpieces, the combination comprising a treating cell adapted to be at least partially immersed in a treating solution and a work rack removably positioned in said cell, said work rack including an elongated frame including hook means at the upper end thereof for suspending said rack, and magnetic means on said frame for magnetically attracting and retaining a plurality of workpieces thereon disposed in longitudinal end-to-end alignment with the concave surfaces thereof facing outwardly of said rack, said treating cell comprising a substantially upright three dimensional enclosure mounted on a wall of a liquid treating receptacle, said enclosure having an open top and including a rear wall adjacent to a treating receptacle, a pair of spaced side walls, and a front wall having an elongated aperture therethrough; a rack supporting member disposed in said enclosure including coacting means thereon for coacting with said work rack for receiving and removably mounting said work rack thereon, a fluid actuated piston and cylinder assembly including a cylinder extending through the wall of a treating receptacle and said rear wall of said enclosure and a piston slidably disposed in said cylinder having the inwardly projecting end thereof connected to said rack supporting member, means for reciprocating said piston to and from a projected position wherein said work rack is disposed in a treating position and the workpieces thereon are disposed in abutting relationship against the rear surface of said front wall and the concave surfaces thereof are disposed in communicating relationship with said elongated aperture and a retracted position wherein the workpieces are spaced from said rear surface of said front wall.

7. In a machine for electroplating the concave surfaces of workpieces, the combination comprising a supporting rail, a work rack movably mounted on said supporting rail means for advancing said work rack along said supporting rail, means for moving said supporting rail to and from a raised position and a lowered position, a liquid treating receptacle disposed below said supporting rail, a treating cell in said treating receptacle adapted to be at least partially immersed in the treating solution therein, said work rack including means thereon for removably supporting a workpiece disposed with the concave surface thereof facing outwardly of said rack, said treating cell comprising a three-dimensional enclosure having an open top and including a front wall having an elongated aperture therethrough, rack supporting means in said treating cell for receiving and removably mounting said work rack when in said lowered position, and power means for moving said supporting means and said rack thereon to and from a treating position wherein the workpiece thereon is disposed in abutting relationship against the rear surface of said front wall and the concave surface thereof is disposed in communicating relationship with said elongated aperture and a load-unload position wherein the workpiece is spaced from said rear surface of said front wall.

8. In a machine for electroplating the concave surfaces of workpieces, the combination comprising a supporting rail, a work rack movably mounted on said supporting rail, means for advancing said work rack along said supporting rail, means for moving said supporting rail to and from a raised position and a lowered position, a liquid treating receptacle disposed below said supporting rail, a treating cell in said treating receptacle adapted to be at least partially immersed in the treating solution therein, said work rack including means thereon for removably supporting a workpiece disposed with the concave surface thereof facing outwardly of said rack, said treating cell comprising a substantially upright three-dimensional enclosure mounted on a wall of said receptacle, said enclosure having an open top and including a rear wall disposed adjacent to said treating receptacle, a pair of spaced side walls, and a front wall having an elongated beveled aperture therethrough tapering outwardly toward the front surface of said front wall; a rack supporting member in said enclosure including means thereon for receiving and removably mounting said work rack and the workpiece thereon in a position substantially parallel to said front wall, guide means extending through said rear wall of said enclosure, rod means slidably disposed in said guide means and connected to said rack supporting member, power means for reciprocating said rod means in said guide means and said rack supporting member to and from a treating position wherein the workpiece on said work rack abuts the rear surface of said front wall and the concave surface thereof is disposed in communicating relationship with said elongated aperture and a load-unload position wherein the workpiece is spaced from said rear surface of said front wall.

9. In a machine for electroplating the concave surfaces of workpieces, the combination comprising a supporting rail, a work rack movably mounted on said supporting rail, means for intermittently advancing said work rack along said supporting rail, an aligned series of treating receptacles disposed below said supporting rail, means for moving said supporting rail to and from a raised position and a lowered position, one of said treating receptacles having a circular configuration and rotatably mounted for rotation about a vertical axis substantially coinciding to the center of said receptacle, a plurality of treating cells disposed in substantially equal arcuate spaced increments in said circular treating receptacle and at least partially immersed in the treating solution therein each of said treating cells comprising a three dimensional enclosure including a front wall having an elongated aperture therethrough, rack supporting means in said cell for receiving and removably mounting said work rack, and means for moving said rack supporting means and said rack thereon to and from a position wherein the workpiece thereon is disposed in abutting relationship against the rear surface of said front wall and the concave surface thereof is disposed in communicating relationship with said elongated aperture and a load-unload position wherein the workpiece is spaced from said rear surface of said front wall, and means for incrementally rotating said circular treating receptacle and said treating cells therein to successively align respective ones of said treating cells for removing and receiving a work rack advanced along said supporting rail.

10. In a machine for electroplating the concave surfaces of workpieces, the combination comprising a supporting rail, a work rack movably mounted on said supporting rail, means for intermittently advancing said work rack along said supporting rail, an aligned series of treating receptacles disposed below said supporting rail, means for moving said supporting rail to and from a raised position and a lowered position, one of said treating receptacles having a circular configuration and rotatably mounted for rotation about a vertical axis substantially coinciding to the center of said receptacle, a plurality of treating cells disposed in substantially equal arcuate spaced increments in said circular treating receptacle and at least partially immersed in the treating solution therein, each of said treating cells comprising a three-dimensional enclosure mounted on the outer wall of said circular treating receptacle, said enclosure having an open top and including a rear wall disposed adjacent to said outer wall receptacle, a pair of spaced side walls, and a front wall having an elongated beveled aperture therethrough tapering outwardly toward the front surface of said front wall; a rack supporting member in said enclosure including means thereon for receiving and removably mounting said work rack and workpiece thereon in a position substantially parallel to said front wall, guide means extending through said rear wall of said enclosure, rod means slidably disposed in said guide means and connected to said rack supporting member, power means for reciprocating said rod means in said guide means and said rack supporting member to and from a treating position wherein the workpiece on said work rack abuts the rear surface of said front wall and the concave surface thereof is disposed in communicating relation with said elongated aperture and a load-unload position wherein the workpiece is spaced from said rear surface of said front wall, and power means for incrementally rotating said circular treating receptacle and said treating cells therein to successively align respective ones of said treating cells for removing and receiving a work rack advanced along said supporting rail.

References Cited in the file of this patent

UNITED STATES PATENTS

| | | |
|---|---|---|
| 2,500,206 | Shaefer et al. | Mar. 14, 1950 |
| 2,591,681 | Davis | Apr. 8, 1952 |
| 2,727,858 | Klein | Dec. 20, 1955 |
| 2,751,340 | Schaefer et al. | June 19, 1956 |
| 2,761,831 | Luechaver | Sept. 4, 1956 |
| 2,890,992 | Hoehl | June 16, 1959 |